United States Patent

[11] 3,597,061

| [72] | Inventor | Albert Stieringer<br>Calmbach, Germany |
|---|---|---|
| [21] | Appl. No. | 866,522 |
| [22] | Filed | Oct. 15, 1969 |
| [45] | Patented | Aug. 3, 1971 |
| [73] | Assignee | Robert Bosch Photokino GmbH<br>Stuttgart-Untertuerkheim, Germany |
| [32] | Priority | Oct. 16, 1968 |
| [33] | | Germany |
| [31] | | P 18 03 336.8 |

[54] ELECTRICALLY OPERATED MOTION PICTURE CAMERA
10 Claims, 1 Drawing Fig.

[52] U.S. Cl. .................................................. 352/91,
352/124, 352/177
[51] Int. Cl. ...................................................... G03b 19/18
[50] Field of Search ........................................... 352/91,
124, 141, 174—179, 217

[56] References Cited
UNITED STATES PATENTS

| 3,265,458 | 8/1966 | Easterly ..................... | 352/177 |
| 3,425,776 | 2/1969 | Mayr et al ................... | 352/175 |

*Primary Examiner*—S. Clement Swisher
*Attorney*—Michael S. Striker

ABSTRACT: A motion picture camera wherein an adjustable dissolving shutter is driven by a reversible electric motor whose circuit can be completed in response to energization of an electromagnet and wherein the circuit of the electromagnet can be opened by either one of two arresting switches one of which is controlled by an adjusting member for the shutter and the other of which is controlled by a timer mechanism which can be coupled to the motor. The motor can be arrested only when the shutter assumes a position in which it prevents scene light from reaching a film frame, regardless of whether the electromagnet is deenergized in response to opening of a starter switch and/or in response to opening of one of the arresting switches.

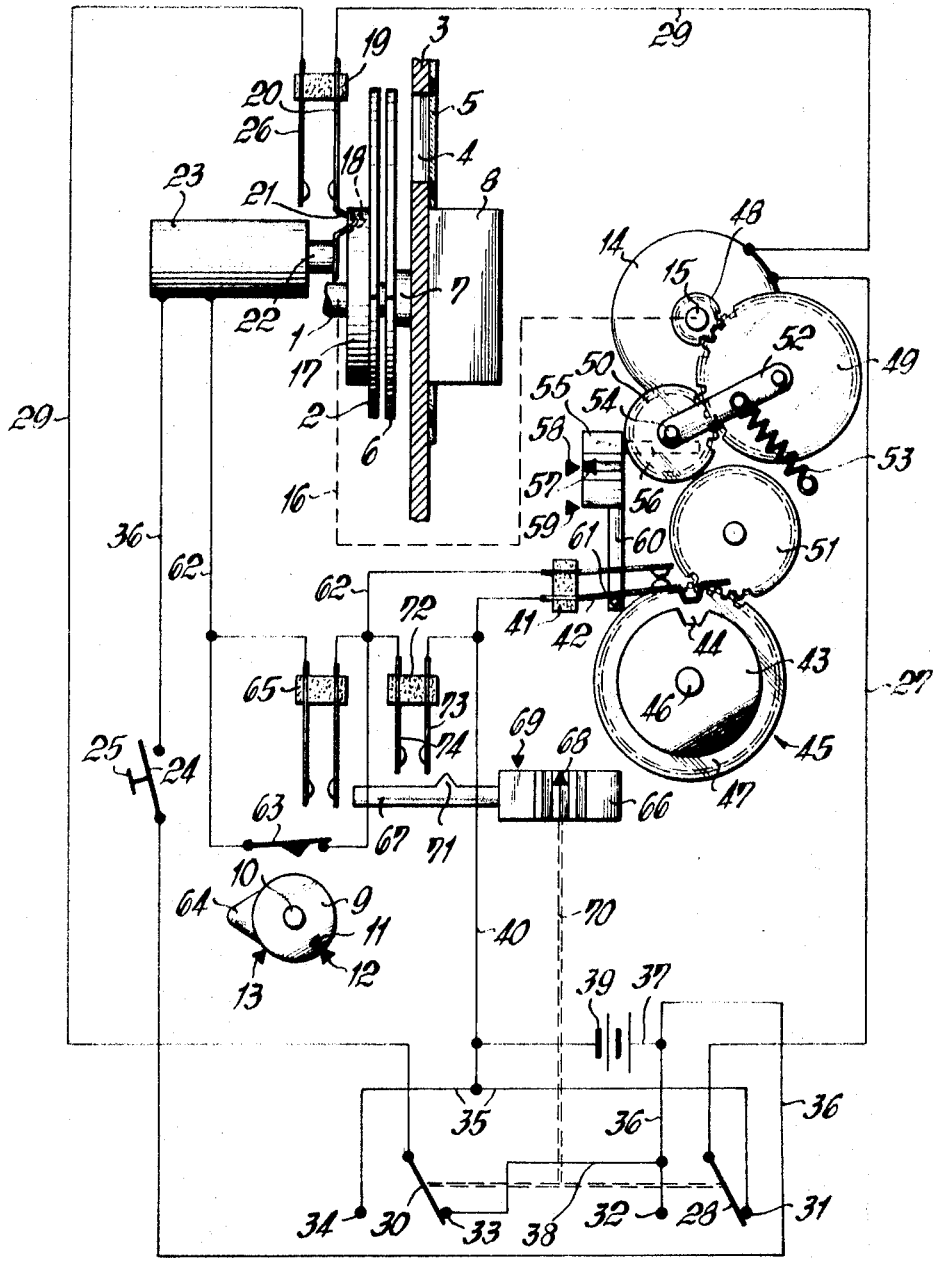

ELECTRICALLY OPERATED MOTION PICTURE CAMERA

CROSS-REFERENCE TO RELATED APPLICATION

The motion picture camera of the present invention constitutes an improvement over and a further development of the camera which is disclosed in the copending application Ser. No. 847,006 filed Aug. 4, 1969 by Theo Wilharm and assigned to the same assignee.

BACKGROUND OF THE INVENTION

The present invention relates to motion picture cameras in general, and more particularly to improvements in motion picture cameras with so-called dissolving shutters enabling the user to produce fadeout and fade-in effects. Still more particularly, the invention relates to improvements in motion picture cameras of the type wherein an electric motor for the shutter can be arrested only when the shutter assumes a predetermined position in which it prevents scene light from reaching a film frame.

German DAS NO. 1,233,718 discloses a motion picture camera wherein the shutter continues to move until it reaches a predetermined position even if the starter switch is opened before the shutter reaches such position. This insures that the film frame which was exposed to scene light just prior to stoppage of the motor for the shutter is not overexposed. Overexposure of such film frame would produce an unpleasant effect during projection of images onto a screen.

The feature that the motor which drives the shutter can be arrested only when the shutter assumes a predetermined position with reference to the light-admitting window is particularly important in motion picture cameras wherein the operation of one or more additional or auxiliary devices depends on the operation and position of the shutter. For example, it is known to provide the rotary shutter blade of a motion picture camera with a mirror which deflects some incoming scene light into the view finder and/or against a photosensitive receiver when the shutter is idle and/or when the shutter is in motion. The amount of light which is deflected into the view finder and/or against the photosensitive receiver is not an optimum amount if the shutter is permitted to come to a standstill in a position in which it can admit light to a film frame. Improper illumination of the photosensitive receiver can affect the accuracy of the exposure meter which is normally used to adjust the aperture of the diaphragm as a function of prevailing scene brightness. If a motion picture camera is provided with an arresting switch which serves to arrest the motor for the shutter independently of the starter switch, the motor is capable of arresting the shutter in any one of several positions, i.e., not necessarily in a position in which the shutter prevents exposure of a film frame to scene light. Such arresting switches are normally used in motion picture cameras with adjustable dissolving shutters and are actuated by a timer mechanism and/or by the adjusting member for the shutter to arrest the motor after exposure of a predetermined film length during fadeout and/or during rewinding which follows the fadeout and precedes the fade-in.

The aforementioned copending application Ser. No. 847,006 discloses a motion picture camera wherein the motor circuit includes a control switch which is closed in response to release of the starter and can be closed after opening of one or more arresting switches to start the motor again in the event that an arresting switch causes stoppage of the motor at a time when the shutter is away from the optimum position, namely, from the position in which it prevents exposure of a film frame. This is a corrective measure and is effective whenever an arresting switch opens the motor circuit at an inopportune time. The length of the interval which elapses between initial stoppage of the motor and the restarting of the motor if an arresting switch opens before the shutter assumes its optimum position depends on the delay with which the user of the camera releases the starter following initial stoppage of the motor. If the delay is considerable, the just mentioned camera is incapable of preventing overexposure of the last film frame.

SUMMARY OF THE INVENTION

An object of the invention is to provide a motion picture camera wherein the shutter is driven by a current-operated motor and wherein the shutter invariably comes to a halt only in that position in which it prevents scene light from reaching a film frame, regardless of whether the opening of the motor circuit is initiated by the user through the intermediary of the starter or by one or more arresting means which can be actuated independently of the starter and not necessarily under direct control of the user.

Another object of the invention is to provide a motion picture camera wherein opening of the circuit of the motor for an adjustable dissolving shutter can be initiated by a timer mechanism and/or by a member which adjusts the dissolving shutter but wherein actual opening of the motor circuit can take place only when the shutter assumes a predetermined position so that the motor need not be restarted in order to insure that the shutter reaches such position if the circuit opening signal furnished by the timer mechanism and/or by the adjusting member is produced at a time when the shutter is away from its predetermined position.

A further object of the invention is to provide a novel electric circuit for a camera with an adjustable dissolving shutter.

One feature of the present invention resides in the provision of a motion picture camera which comprises adjustable dissolving shutter means movable to and from a predetermined position, current-operated drive means for the shutter means, normally open master switch means in circuit with the drive means, closing means for the master switch means, such closing means preferably including electromagnet means having operative and inoperative conditions which preferably correspond to energized and deenergized conditions of the electromagnet means, starter means actuatable by a pushbutton or the like to render the closing means operative, retaining means movable with the shutter means and arranged to hold the master switch means in closed position when the shutter means is away from the predetermined position, arresting means having first and second positions and arranged to render the closing means inoperative in one of its positions independently of the arresting means between first and second positions. Such control means may include a timer mechanism and/or an adjusting member for the dissolving shutter means.

The novel features which are considered as characteristic of the invention are set forth in particular in the appended claims. The improved motion picture camera itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a schematic partly sectional view of a portion of a motion picture camera which embodies the invention.

DESCRIPTION OF THE PREFERRED EMBODIMENTS

Referring to the drawing in detail, there is shown a portion of a motion picture camera including a housing having an internal wall or partition 3 provided with a light-admitting window or opening 4. The housing accommodates the shaft 1 of an adjustable dissolving shutter which further includes an apertured rotary blade 2 affixed to the shaft 1 and a second apertured blade 6 which normally shared all movements of but is adjustable angularly with reference to the blade 2 in order to change the effective area of the aperture in the blade 2 between zero and a maximum value in a manner well known from the art of such cameras. The motion picture film 5 is transported stepwise behind the window 4 by a suitable transporting mechanism, such as a conventional claw pulldown, not shown. In normal operation of the camera, the revolving shutter blades 2, 6 admit scene light into the window 4 when the transport of film 5 by the length of a frame is completed. The adjustable blade 6 is mounted on a hollow shaft 7 which is coaxial with and turnable relative to the shaft 1. The shaft 1 and 7 extend into a gearbox 8 which is shown as being mounted on the partition 3 and accommodates a conventional adjusting mechanism capable of changing the angular position of the shaft 7 with reference to the shaft 1 to thereby determine the effective area of the aperture in the blade 2. The means for effecting adjustment of the blade 6 relative to the blade 2 comprises a manually operated adjusting member or knob 9 (shown for convenience as being remote from the box 8) which can turn an input shaft 10 of the adjusting mechanism in the box 8. The shaft 7 is the output member of such adjusting mechanism. The adjusting knob 9 is provided with an index or marker 11 and is movable between two end positions in which the index 11 respectively registers with marks or graduations 12, 13 provided on a stationary part (e.g., on a side wall) of the camera housing. The knob 9 is readily accessible to the user of the camera and, when the index 11 assumes the illustrated position of registry with the mark 12, the blade 6 permits the shutter to admit a maximum amount of scene light to the film 5, i.e., the shutter is then fully open. The shutter is closed (i.e., the rear blade 6 fully overlaps the aperture of the front blade 2) when the index registers with the mark 13. The knob 9 is further provided with a lobe or trip 64 whose function will be described later. The effective area of the aperture in the front shutter blade 2 changes gradually when the knob 9 is turned to move the index 11 from registry with the mark 12 toward registry with the mark 13 or vice versa.

The current-operated drive means for the blades 2 and 6 of the dissolving shutter comprises a prime mover here shown as a reversible electric motor 14 which is connected with the shaft 1 by a suitable power train (e.g., a train of mating gears) indicated by a dotted line 16. This power train receives motion from the output shaft 15 of the electric motor 14.

The front shutter blade 2 is formed with a concentric retaining collar 17 having a recess or notch 18 which can receive a suitably bent projection 21 of a movable elastic switch contact 20 when the blade 2 assumes a predetermined angular position, namely, a position in which the front blade 2 prevents scene light from reaching the window 4 irrespective of the position of the rear blade 6. The contact 20 forms part of a normally open master switch 19 which is in circuit with the motor 14 and further includes a second contact 26. The closing of master switch 19 results in completion of the circuit of the motor 14; this switch tends to open automatically when the contact 20 is permitted to move away from the contact 26 due to its own elasticity, i.e., when the projection 21 registers with the notch 18 and when the contact 20 is not held against movement away from the contact 26. The closing means for closing the master switch 19 independently of the retaining collar 17 on the shutter blade 2 includes an electromagnet 23 having a reciprocable armature 22 which can attract the free end of the contact 20 in a direction to engage the contact 20 with the contact 26 when the electromagnet 23 is energized in response to closing of a starter switch 24 having a manually operated pushbutton 25. The armature 22 is reciprocable in parallelism with the optical axis of the camera. The switch 24 is actuatable by the pushbutton 25 to render the closing electromagnet operative.

The axial length or height of the retaining collar 17 on the front shutter blade 2 is such that the master switch 19 remains closed regardless of whether the electromagnet 23 is energized or not, as long as the projection 21 of the contact 20 does not register with the notch 18. Thus, the user of the camera can release the pushbutton 25 (whereby the starter switch 24 opens automatically) to effect deenergization of the electromagnet 23, but the motor 14 will continue to run until the notch 18 of the retaining collar 17 reaches and receives the projection 21.

The electric circuit of the motor 14 includes a conductor 27 which is connected with a movable contact 28 and a second conductor 29 which contains the master switch 19 and is connected with a movable contact 30. The movable contacts 28, 30 are respectively flanked by pairs of fixed contacts 31, 32 and 33, 34. The fixed contacts 31, 34 are connected to each other by a conductor 35. A conductor 36 connects the fixed contact 32 with one terminal of the electromagnet 23 and contains the starter switch 24. A first branch 37 connects the conductor 36 with one pole of an energy source 39 (e.g., a battery) and a second branch 38 connects the conductor 36 with the fixed contact 33. A branch 40 connects the conductor 35 with one terminal of a first arresting switch 41 having a movable elastic contact 42 which is provided with a projection tending to enter a recess or notch 44 provided in a disk 43 which forms part of a timer mechanism 45. The branch 40 is further connected with the other pole of the energy source 39. The purpose of the arresting switch 41 is to initiate opening of the motor circuit independently of the position of the starter switch 24. The timer mechanism 45 is used during fadeout as well as during rewinding of film prior to fade-in; its purpose is to determine the maximum length of film which is exposed during fadeout and to insure that the same length of film is rewound when the motor 14 is operated in reverse prior to fade-in. The timer mechanism 45 controls the arresting switch 41 in such a way that the latter opens automatically to initiate opening of the motor circuit when the projection of the movable contact 42 enters the notch 44 upon completion of fadeout and upon completion of rewinding of the film 5 following the fadeout and prior to fade-in.

The timer mechanism 45 further comprises a shaft 46 which is rigid with the disk 43 and with a gear 47 mating with an intermediate gear 51. The latter can receive torque from a further gear 50 in response to counterclockwise pivotal movement of a coupling lever 52 which is biased in such direction by a helical spring 53 but is normally held in the illustrated disengaging position by the arm 56 of a reciprocable actuating member of knob 55. The arm 56 engages the shaft 54 for the gear 50. This latter gear is in permanent mesh with a gear 49 which mates with a pinion 48 on the output shaft 15 of the motor 14. The coupling lever 52 is pivotable about the axis of the shaft for the gear 49; therefore, the gear 50 is in permanent mesh with the gear 49 and can drive the disk 43 as soon as the spring 53 is free to contract in response to movement of the actuating knob 55 from the illustrated idle position (in which an index 57 on the knob registers with a stationary mark 58) to a second or operative position in which the index 57 registers with a second fixed mark 59. The disk 43 rotates in a clockwise direction when the motor 14 drives its shaft 15 and pinion 48 in the same direction. The actuating knob 55 is provided with a suitable detent structure (not shown) which is capable of holding it in the illustrated position against the action of the spring 53. This knob is further provided with a second arm 60 having a post 61 which engages the contact 42 and automatically closes the arresting switch 41 irrespective of the position of the disk 43 when the knob 55 assumes the illustrated position (index 57 in registry with the mark 58). It will be seen that the arresting switch 41 is always closed when the coupling in the gear train between the output shaft 15 of the motor 14 and the disk 43 of the timer mechanism 45 is disengaged. The arrangement is such that, when the actuating knob 55 is moved downwardly, as viewed in the drawing, to place the index 57 into registry with the mark 59, the notch 44 of the disk 43 is away from registry with the projection of the contact 42 so that the arresting switch 41 remains closed when the lever 52 permits the gear 50 to transmit torque from the gear 49 to the gear 51. The contact 42 then bears against the periphery of the disk 43 and the arresting switch 41 remains closed while the disk 43 rotates.

A conductor 62 connects the other terminal of the arresting switch 41 with the other terminal of the electromagnet 23 and contains a second arresting switch 63 which is normally closed and opens only when the adjusting knob 9 is rotated to move the index 11 into registry with the mark 13, i.e., when the shutter is closed. The arresting switch 63 is then opened by the lobe or trip 64 of the adjusting knob 9. The conductor 62 contains a normally open bypass switch 65 which is in parallel with the arresting switch 63 and can be closed in response to actuation (shifting) of a reciprocable motor reversing knob 66 having an extension 67 which closes the switch 65 when the index 68 of the knob 66 is moved from the illustrated position into registry with a fixed mark 69. A linkage 70 or an analogous mechanical connection between the knob 66 and the movable contacts 28, 30 causes these contacts to move away from the fixed contacts 31, 33 and to respectively engage the fixed contacts 32, 34 when the index 68 is moved into registry with the mark 69.

The extension 67 of the knob 66 has a trip 71 in the form of a protuberance or lobe which can temporarily close the contacts 73, 74 of a further bypass switch 72 while the index 68 travels toward registry with the mark 69. The bypass switch 72 is normally open and is installed between the branch 40 and conductor 62. This switch is closed temporarily during an intermediate stage of movement of the extension 67 toward engagement with the right-hand contact of the bypass switch 65. The purpose of the bypass switch 72 is to complete that part of the circuit which includes the closing electromagnet 23 and the arresting switch 41. The timer mechanism 45 and the shutter adjusting knob 9 together constitute a control unit which can effect movements of arresting switches 41, 63 between their open and closed positions.

The operation:

The motor 14 is started in forward direction in response to depression of the pushbutton 25 which thereby closes the starter switch 24. This energizes the electromagnet 23 whose armature 22 withdraws the projection 21 of the movable contact 20 from the notch 18 of the retaining collar 17 so that the master switch 19 closes and completes the circuit of the motor 14. The circuit of the electromagnet 23 is completed from one pole of the energy source 39, through the branch 37 and conductor 36, starter switch 24, the winding of the electromagnet 23, conductor 62, arresting switch 63, arresting switch 41, branch 40, and to the other pole of the energy source 3. When the master switch 19 is closed by the electromagnet 23, the circuit of the motor 14 is completed from the one pole of the energy source 39, through the branch 37, conductor 36, branch 38, contacts 33, 30, conductor 29, master switch 19, the corresponding winding means of the motor 14, conductor 27, contacts 28, 31, conductor 35, branch 40 and to the other pole of the energy source 39. The power train 16 drives the shaft 1 and the blades 2, 6 in fully open position of the shutter so that the shutter admits maximum amounts of scene light to successive frames of the film 5 which is being transported by the claw pulldown receiving motion from the motor 14 in a well-known manner, not shown. The film 5 is being transported in a forward direction.

In order to initiate stoppage of the motor 14, the user simply releases the knob 25 whereby the starter switch 24 opens and deenergizes the electromagnet 23. However, the master switch 19 remains closed so that the motor 14 continues to drive the blades 2, 6 until the notch 18 of the retaining collar 17 reaches and receives the projection 21 of the movable contact 20. Thus, even though the armature 22 permits the movable contact 20 to move away from the second contact 26 of the master switch 19 as soon as the starter switch 24 opens, actual stoppage of the motor 14 takes place only when the master switch 19 is permitted to open in a predetermined angular position of the blade 2, namely, when this blade completely overlies the window 4 irrespective of the position of the adjustable blade 6.

If the user wishes to produce a fadeout effect (to be normally followed by a fade-in effect), the actuating knob 55 is displaced to move the index 57 into registry with the mark 59 while the motor 14 is running (i.e., while the starter switch 24 is closed). The spring 53 is then free to pivot the coupling lever 52 in a counterclockwise direction to engage the gear 50 with the gear 51 and to rotate the disk 43 in a clockwise direction. At the same time, the post 61 of the arm 60 on the knob 55 moves away from the movable contact 42 but the arresting switch 41 remains closed because the projection of the contact 42 bears against the periphery of the disk 43 which rotates in a clockwise direction. The timer mechanism 45 is operative and maintains the arresting switch 41 in closed position (motor 14 running in a forward direction) until the disk 43 completes a revolution and moves its notch 44 into registry with the projection of the movable contact 42. The fadeout effect is produced in response to slow turning of the adjusting knob 9 in a clockwise direction (subsequent to starting of the timer mechanism 45) to gradually move the index 11 into registry with the mark 13 and to thereby gradually reduce the effective area of the aperture in the shutter blade 2 to zero. When the index 11 reaches the mark 13, the lobe 64 of the actuating knob 9 suddenly opens the arresting switch 63 to effect deenergization of the electromagnet 23. However, the motor 14 continues to run until the notch 18 of the retaining collar 17 reaches and receives the projection 21 of the movable contact 20.

One important function of the timer mechanism 45 is to determine the maximum length of that part of the film 5 which can be exposed during fadeout. Thus, if the user is very slow in turning the adjusting knob 9 in a clockwise direction to move the index 11 into registry with the mark 13, the disk 43 completes one revolution and permits opening of the arresting switch 41 before the lobe 64 of the adjusting knob 9 opens the arresting switch 63. The result is the same, i.e., opening of the arresting switch 41 causes deenergization of the electromagnet 23 which permits opening of the master switch 19 and resulting stoppage of the motor 14 as soon as the notch 18 of the retaining collar 17 reaches the projection 21 of the movable contact 20. The disk 43 permits opening of the arresting switch 41 when the projection of the contact 42 registers with the notch 44 because the actuating knob 55 is held in a position in which its index 57 registers with the mark 59 so that the post 61 on the arm 60 of the knob 55 does not interfere with movement of the contact 42 away from the other contact of the switch 41. The collar 17 insures that stoppage of the motor 14 can take place only when the shutter blade 2 prevents entry of scene light into the window 4, irrespective of the position of the shutter blade 6.

Prior to producing a fade-in effect (during which the film frames which were exposed during fadeout are exposed again so that the start of a new series of exposures is superimposed on the end of the preceding series of exposures), the user must rewind the film 5 by moving backwardly that same length of film which was exposed during fadeout. This is achieved by depressing the pushbutton 25 to close the starter switch 24 and by moving the rewinding or reversing knob 66 in a direction to the left, as viewed in the drawing, so as to place the index 68 into registry with the mark 69. The extension 67 of the knob 66 then closes the bypass switch 65 and the lobe 71 of the extension 67 temporarily closes the bypass switch 72 by moving the contact 73 against the contact 74. The switch 65 remains closed during the entire rewinding operation but the switch 72 can open immediately after the lobe 71 moves past the movable contact 73. The innate resiliency of the contact 73 is such that the switch 72 opens as soon as the contact 73 is not biased against the contact 74.

The reversing knob 66 further causes the linkage 70 to move the contacts 28, 30 into engagement with the fixed contacts 32, 34 whereby the circuit of the electromagnet 23 is completed from the one pole of the energy source 39, through the branch 37 and conductor 36, starter switch 24, the winding of the electromagnet 23, conductor 62, closed bypass switch 65, closed bypass switch 72, branch 40, and to the other pole of the energy source 39. It is assumed that both arresting switches (41 and 63) are open when the reversing knob 66 is actuated to close the bypass switches 65 and 72. Temporary closing of bypass switch 72 suffices to complete the circuit of the electromagnet 23 so that the armature 22 withdraws the projection 21 from the notch 18 and the master switch 19 closes to start the motor 14 in reverse whereby the notch 18 moves away from the projection 21 and the retaining collar prevents opening of the master switch 19 even though the electromagnet 23 might be deenergized with little delay because the lobe 71 of the extension 67 permits the bypass switch 72 to open. The circuit of the motor 14 is completed on closing of the master switch 19 and on movement of contacts 28, 30 into engagement with the contacts 32, 34 in the following way: from the one pole of the energy source 39, through the branch 37 and conductor 36, contacts 32, 28, conductor 27, the corresponding winding means of the motor 14, conductor 29, master switch 19, contacts 30, 34, conductor 35, branch 40, and to the other pole of the energy source 39. The actuating knob 55 still remains in the other position in which its index 57 registers with the mark 59 so that the gear train between the output shaft 15 and the disk 43 is operative whereby the disk 43 rotates in a counterclockwise direction and the projection of the contact 42 engages the periphery of the disk 43 to maintain the arresting switch 41 in closed position before the lobe 71 on the extension 67 of the reversing knob 66 permits the bypass switch 72 to open. Thus, the electromagnet 23 remains energized after opening of the switch 72 because the latter is connected in parallel with the arresting switch 41. When the disk 43 completes one revolution in a counterclockwise direction, the notch 44 moves into registry with the projection of the contact 42 and permits the arresting switch 41 to open and to deenergize the electromagnet 23. The motor 14 is stopped as soon as the notch 18 of the retaining collar 17 moves into registry with the projection 21 to permit opening of the master switch 19 in that position of the blade 2 in which the window 4 is sealed from scene light. The user then releases the pushbutton 25 to permit opening of the starter switch 24, and the reversing knob 66 is returned to the illustrated idle position to effect opening of the bypass switch 65. At the same time, the contacts 28, 30 return into engagement with the fixed contacts 31, 33 so that the motor 14 is prepared for operation in a forward direction.

Prior to start of fade-in, the user returns the actuating knob 55 to the illustrated position to thereby close the arresting switch 41 through the intermediary of the arm 60 and post 61. At the same time, the arm 56 of the actuating knob 55 moves the lever 52 against the opposition of the spring 53 so that the gear 50 is disengaged from the gear 51. In the next step, the user depresses the pushbutton 25 to close the starter switch 24 and the adjusting knob 9 is rotated slowly in a counterclockwise direction to move the index 11 away from the mark 13 and toward registry with the mark 12. The circuit of the motor 14 is not completed merely in response to pressing of the pushbutton 25 because such completion necessitates simultaneous closing of the arresting switches 41 and 63. The latter is closed as soon as the index 11 moves away from registry with the mark 13 whereby the shutter gradually increases the amount of scene light as the user continues to turn the adjusting knob 9 to move the index 11 back into full registry with the mark 12. The camera thereupon continues to make exposures, with the shutter in fully open position, as long as the user continues to press the pushbutton 25. The adjusting knob 9 is preferably rotated counterclockwise at the same speed as during rotation in a clockwise direction so that the interval required for completion of fade-in at least approximates the interval which was needed for completion of fadeout. Closing of the arresting switch 63 (in response to movement of the index 11 away from registry with the mark 13) is necessary in order to complete the circuit of the electromagnet 23 which then causes the master switch 19 to close in the aforedescribed manner. When the pushbutton 25 is released, the motor 14 is arrested as soon as the notch 18 of the retaining collar 17 returns into registry with and receives the projection 21 of the contact 20.

An important advantage of the improved motion picture camera is that the arresting switches 41, 63 are in circuit with the closing electromagnet 23 so that stoppage of the electric motor 14 is always initiated by way of the electromagnet 23, irrespective of whether the signal comes from the starter switch 24, from the arresting switch 41, or from the arresting switch 63. Otherwise stated, the arresting switches are not directly connected in the circuit of the motor 14 and cannot arrest the motor independently of the master switch 19. Since the latter can open only when permitted by the retaining collar 17, the shutter can only be arrested when the blade 2 assumes the aforementioned predetermined position in which it prevents scene light from reaching the window 4 and film 5. The motor 14 need not be restarted following opening of the starter switch 24 if the arresting switch 41 and/or 63 opens at a time when the notch 18 of the retaining collar 17 is not in registry with the projection 21 of the contact 20.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims.

I claim:

1. In a motion picture camera, a combination comprising shutter means movable to and from a predetermined position; current-operated drive means for said shutter means; normally open master switch means in circuit with said drive means; closing means for said master switch means, said closing means having an operative and an inoperative condition; starter means actuatable to render said closing means operative; retaining means movable with said shutter means and arranged to hold said master switch means in closed position when said shutter means is away from said predetermined position; arresting means having first and second positions and arranged to render said closing means inoperative in one of said positions thereof independently of said starter means; and control means 2. A combination as defined in claim 1, wherein said arresting means comprises at least one arresting switch which is open in said first position and closed in said second position thereof.

3. A combination as defined in claim 2, wherein said closing means comprises an electromagnet which is in circuit with said arresting switch and is energizable in response to actuation of said starter means.

4. A combination as defined in claim 3, wherein said electromagnet has an armature cooperating with said master switch means to close the latter in energized condition of said electromagnet, said retaining means being arranged to hold said master switch means in closed position irrespective of the condition of said electromagnet when the shutter means is away of said predetermined position thereof.

5. In a motion picture camera, a combination comprising adjustable dissolving shutter means; reversible electric drive means for said shutter means; normally open master switch means in circuit with said drive means; closing means for said master switch means; adjusting means for said shutter means; arresting switch means in circuit with said closing means; bypass switch means connected in parallel with said arresting switch means; timer means operable by said drive means and arranged to render said closing means inoperative after a predetermined interval of time; coupling means engageable to connect said drive means with said timer means; actuating means movable between a first position in which said coupling means is engaged and a second position in which said coupling means is engaged and a second position in which it closes said arresting switch means; and reversing means actuatable to reverse said drive means and to close said bypass switch means.

6. A combination as defined in claim 5, wherein said actuating means is arranged to release said arresting switch means with a delay following engagement of said coupling means.

7. A combination as defined in claim 6, wherein said closing means comprises an electromagnet which is energizable when at least one of said arresting and bypass switch means is closed.

8. A combination as defined in claim 5, wherein said reversing means is arranged to temporarily close said bypass switch means in response to actuation thereof.

9. A combination as defined in claim 5, wherein said actuating means and said reversing means comprise manually operated members.

10. A combination as defined in claim 5, wherein said adjusting means comprises a manually operated adjusting member and further comprising second arresting switch means in circuit with said closing means and arranged to open in response to movement of said manually operated adjusting member to a predetermined position.

PO-1050
(5/69)

UNITED STATES PATENT OFFICE
CERTIFICATE OF CORRECTION

Patent No. 3,597,061            Dated August 3, 1971

Inventor(s) Albert STIERINGER

It is certified that error appears in the above-identified patent and that said Letters Patent are hereby corrected as shown below:

At the end of claim 1, add the following words:

--for effecting movements of said arresting means between said positions thereof--.

Signed and sealed this 2nd day of May 1972.

(SEAL)
Attest:

EDWARD M. FLETCHER, JR.
Attesting Officer

ROBERT GOTTSCHALK
Commissioner of Patents